(12) United States Patent
Jailani

(10) Patent No.: US 11,212,179 B2
(45) Date of Patent: *Dec. 28, 2021

(54) AUTOMATIC CONFIGURATION OF A NETWORK SWITCH IN A MULTI-CHASSIS LINK AGGREGATION GROUP

(71) Applicant: Super Micro Computer, Inc., San Jose, CA (US)

(72) Inventor: Sahul Hameed Abdul Kader Jailani, San Jose, CA (US)

(73) Assignee: SUPER MICRO COMPUTER, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/660,721

(22) Filed: Oct. 22, 2019

(65) Prior Publication Data

US 2020/0119990 A1  Apr. 16, 2020

Related U.S. Application Data

(63) Continuation of application No. 15/265,719, filed on Sep. 14, 2016, now Pat. No. 10,454,766.

(Continued)

(51) Int. Cl.
*G06F 15/16* (2006.01)
*H04L 12/24* (2006.01)
(Continued)

(52) U.S. Cl.
CPC .......... *H04L 41/0886* (2013.01); *H04L 12/40* (2013.01); *H04L 12/413* (2013.01);
(Continued)

(58) Field of Classification Search
CPC ... H04L 12/40; H04L 12/413; H04L 41/0806; H04L 41/0886; H04L 41/12; H04L 45/245

See application file for complete search history.

(56) References Cited

U.S. PATENT DOCUMENTS 5,517,652 A   5/1996   Miyamoto et al.
7,729,361 B2   6/2010   Ma et al.
(Continued)

FOREIGN PATENT DOCUMENTS

CN   104486124 A   4/2015
CN   104639464 A   5/2015

*Primary Examiner* — Ario Etienne
*Assistant Examiner* — Thorne E Waugh
(74) *Attorney, Agent, or Firm* — Artegis Law Group, LLP

(57) ABSTRACT

Various embodiments set forth a method for automatically configuring a multi-chassis link aggregation group (MLAG), including receiving first system information associated with the MLAG, receiving a first discovery packet via a first uplink port associated with a first switch that is included in the MLAG, where the first discovery packet includes second system information associated with the MLAG, determining whether the first system information matches the second system information, where if the first system information matches the second system information, then concluding that the first uplink port is included in an inter peer link connecting the first switch to a second switch that also is included in the MLAG, and if the first system information does not match the second system information, then concluding that the first uplink port is not included in the inter peer link. Advantageously, the method avoids requiring a user to enter hundreds of commands manually.

20 Claims, 4 Drawing Sheets

Related U.S. Application Data

(60) Provisional application No. 62/325,926, filed on Apr. 21, 2016.

(51) Int. Cl.
 *H04L 12/40* (2006.01)
 *H04L 12/413* (2006.01)
 *H04L 12/709* (2013.01)

(52) U.S. Cl.
 CPC .......... *H04L 41/0806* (2013.01); *H04L 41/12* (2013.01); *H04L 45/245* (2013.01)

(56) References Cited

U.S. PATENT DOCUMENTS

| | | | |
|---|---|---|---|
| 8,761,005 B2 | 6/2014 | Subramanian | |
| 8,996,350 B1* | 3/2015 | Dub | G06F 16/35 |
| | | | 704/1 |
| 9,385,942 B2 | 7/2016 | Grosser, Jr. et al. | |
| 9,461,880 B2* | 10/2016 | Saltsidis | H04L 41/0668 |
| 9,491,043 B2* | 11/2016 | Kaneko | H04L 49/552 |
| 9,660,901 B2 | 5/2017 | Sivasankar et al. | |
| 9,813,290 B2* | 11/2017 | Saltsidis | H04L 45/021 |
| 10,044,558 B2 | 8/2018 | Namihira | |
| 10,050,855 B1* | 8/2018 | Singh | H04L 45/245 |
| 10,193,707 B2* | 1/2019 | Zhang | H04L 12/4641 |
| 2003/0061132 A1* | 3/2003 | Yu, Sr. | G06Q 30/0205 |
| | | | 705/30 |
| 2012/0275297 A1* | 11/2012 | Subramanian | H04L 45/245 |
| | | | 370/225 |
| 2012/0314715 A1 | 12/2012 | Janardhanan | |
| 2014/0071810 A1 | 3/2014 | Kumagai | |
| 2014/0133486 A1 | 5/2014 | Sivasankar et al. | |
| 2014/0226461 A1 | 8/2014 | Hashimoto et al. | |
| 2015/0049761 A1 | 2/2015 | Kumagai et al. | |
| 2015/0319083 A1 | 11/2015 | Grosser, Jr. et al. | |
| 2017/0163473 A1* | 6/2017 | Sadana | H04L 47/125 |
| 2017/0250867 A1 | 8/2017 | Kohli et al. | |
| 2017/0257309 A1 | 9/2017 | Appanna | |

\* cited by examiner

AUTOMATIC CONFIGURATION OF A NETWORK SWITCH IN A MULTI-CHASSIS LINK AGGREGATION GROUP

CROSS-REFERENCE TO RELATED APPLICATIONS

This application is a continuation of the co-pending U.S. patent application titled, "AUTOMATIC CONFIGURATION OF A NETWORK SWITCH IN A MULTI-CHASSIS LINK AGGREGATION GROUP," filed on Sep. 14, 2016 and having Ser. No. 15/265,719, which claims the benefit of U.S. provisional patent application titled, "AUTOMATED MULTI-CHASSIS LINK AGGREGATION," filed on Apr. 21, 2016 and having Ser. No. 62/325,926. The subject matter of these related applications is hereby incorporated herein by reference.

BACKGROUND OF THE INVENTION

Field of the Invention

Embodiments of the present invention relate generally to network switches and, more specifically, to automatic configuration of a network switch in a multi-chassis link aggregation group.

Description of the Related Art

In Ethernet switch systems, a conventional link aggregation group (LAG) oftentimes represents multiple links connected to a single physical switch. A common media access control (MAC) address serves as the address of the switch on all of the aggregated links, which allows traffic to be sent to the switch on any of the aggregated links at the same MAC address. Thus, the aggregated links appear as a single link to the transmitting devices, such as server machines, where the transmitting devices do not know that there are multiple links connected via the single MAC address. One advantage of a conventional LAG is that, if one of the aggregated links fails, the other aggregated links remain active, which preserves a portion of the original bandwidth provided by the aggregated links. However, one disadvantage of a conventional LAG is that, if the physical switch fails, all of the aggregated links are disconnected, and all of the original bandwidth provided by the aggregated links is lost.

To remedy this problem, a pair of physical switches (i.e., two different physical devices, or chassis) replaces the single switch, and a multi-chassis link aggregation group (MLAG) represents multiple links connected to this pair of physical switches. In the case of an MLAG system, each transmitting device has two links to the pair of switches, with one link connected to each switch. Similar to a conventional LAG, the same common MAC address serves as the address of either switch on all of the aggregated links. Thus, the aggregated links to either switch appear as a single link to the transmitting devices, such as server machines, where the transmitting devices do not know that there are multiple links or multiple switches connected via the single MAC address. One advantage of an MLAG system similar to a conventional LAG is that, if one of the aggregated links fails, the other aggregated links remain active, which preserves a portion of the original bandwidth provided by the aggregated links. One additional advantage of an MLAG system over a conventional LAG is that, if a physical switch (or chassis) fails, there is still one other physical switch remaining active, which preserves a portion of the original bandwidth provided by the aggregated links. Thus, in contrast to a traditional LAG, where a physical switch failure causes all of the original bandwidth provided by the aggregated links to be lost, in an MLAG system, a physical switch failure preserves some of the original bandwidth.

When establishing an MLAG system, the switches and links must be configured, for instance, by entering commands through a command line interface (CLI) on a computing device connected to the MLAG system. A first configuration step is to configure the common interface between the two switches (e.g., a first switch and a second switch). This first configuration step requires entering at a minimum five commands entered for each of the first and second switches, including commands to enable MLAG communication between the switches, commands setting a system_identifier as the common MAC address for both switches, and commands to establish an inter peer link (IPL) between the first and second switches. A second configuration step is to configure all connections between the switches and downlink transmitting devices, such as server machines. This second configuration step requires entering at a minimum four commands for each link between each of the first and second switches and each downlink transmitting device. Thus, for each downlink transmitting device, these four commands must be issued twice, once for the first switch, and once for the second switch.

One drawback to the above approach is that a large number of commands must be entered through the CLI in order to configure the MLAG system. In a typical implementation, each of the first and second switches may include a large number (e.g., up to 56 or more) of downlink ports (or links to downlink transmitting devices). In this implementation, configuring the MLAG system requires manually entering hundreds of commands through the CLI, which is time-consuming and tedious, and is thus prone to human-error. Further, whenever there is a change in the MLAG system, such as a change of a cable or a change of one of the physical switches (or chassis), many or all of the configuration commands must be entered again.

As the foregoing illustrates, what is needed in the art is a more effective approach for configuring MLAG systems.

SUMMARY OF THE INVENTION

Various embodiments of the present invention set forth a computer-implemented method for automatically configuring a multi-chassis link aggregation group (MLAG), the method including receiving first system information associated with the MLAG, receiving a first discovery packet via a first uplink port associated with a first switch that is included in the MLAG, where the first discovery packet includes second system information associated with the MLAG, determining whether the first system information matches the second system information, where if the first system information matches the second system information, then concluding that the first uplink port is included in an inter peer link connecting the first switch to a second switch that also is included in the MLAG, and if the first system information does not match the second system information, then concluding that the first uplink port is not included in the inter peer link.

Advantageously, the technique for automatically configuring an MLAG described herein allows all connections of an MLAG to be configured automatically without requiring a user to enter hundreds of commands manually, such as through a CLI, as a user's entering of hundreds of commands manually would be time-consuming and tedious, and thus would be prone to human-error.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
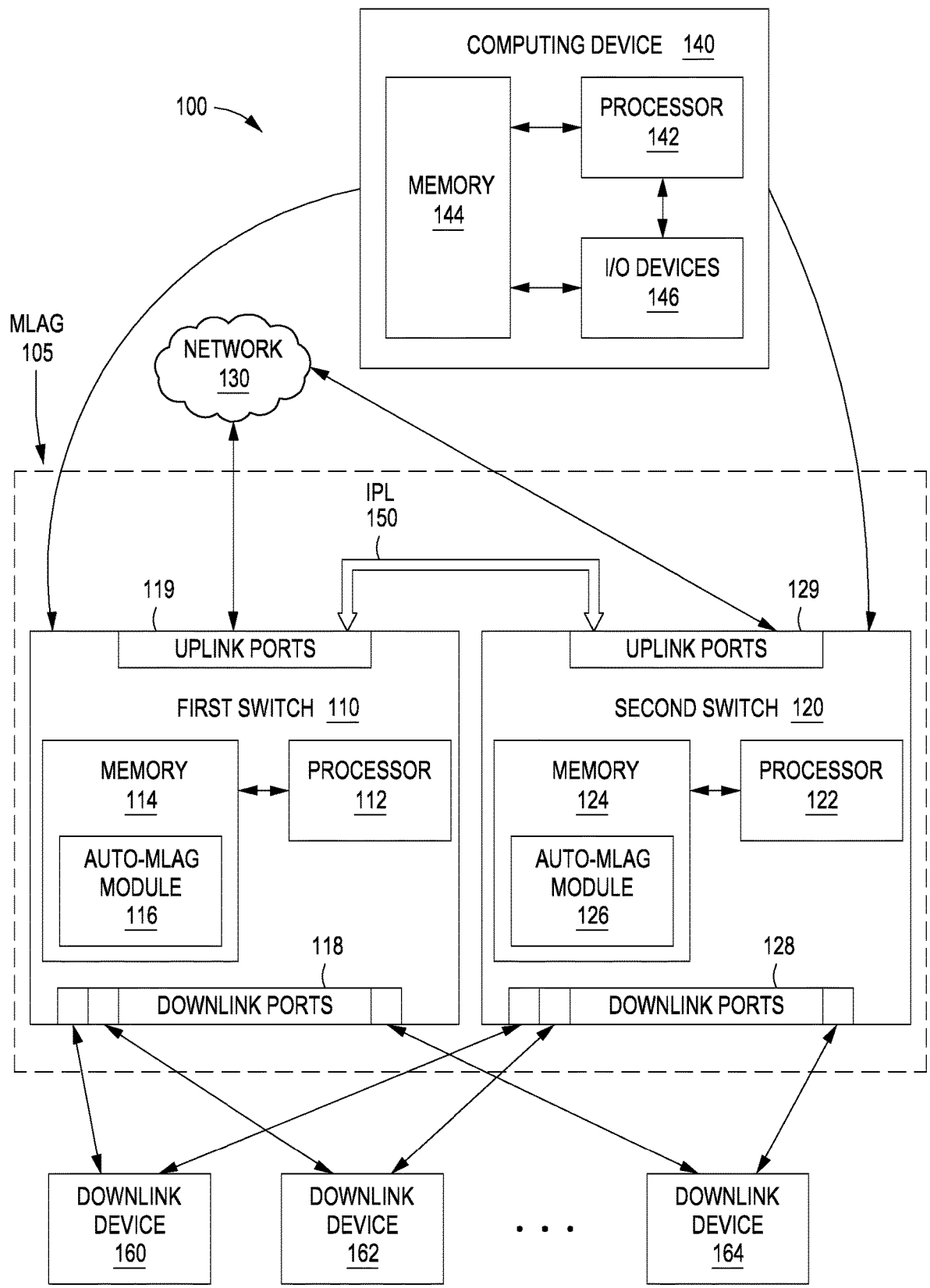
FIG. 1 is a block diagram illustrating a system configured to implement one or more aspects of the present invention.

FIG. 1 illustrates a system 100 configured to implement one or more aspects of the present invention. As shown, system 100 includes, without limitation, a first switch 110 coupled via an inter peer link (IPL) 150 to a second switch 120. Each of first switch 110 and second switch 120 is coupled to a network 130 and to a group of downlink devices 160-164, including a first downlink device 160, a second downlink device 162, and an Nth downlink device 164. In addition, system 100 may include a computing device 140 coupled to each of the first switch 110 and the second switch 120.

In operation, the first switch 110 and the second switch 120 are two physical switches, or chassis, that make up a multi-link aggregation group (MLAG) 105. In various embodiments, the first switch 110 and the second switch 120 may be the same type of switch and also may have the same switch model number. The first switch 110 and the second switch 120 also may have the same number of uplink ports and the same number of downlink ports. As part of the same MLAG 105, the first switch 110 and the second switch 120 share a common MAC address; therefore, when communicating with the first switch 110 and the second switch 120, the downlink devices 160-164 transmit communications addressed to that common MAC address.

The first switch 110 can be any type of technically feasible network switch, including an Ethernet switch, among others. The first switch 110 includes, without limitation, downlink ports 118, uplink ports 119, a processor 112, and a memory 114. The first switch 110 is coupled to downlink devices 160-164 through downlink ports 118. Downlink ports 118 may be any technically feasible port connection for bi-directional communications, including RJ45 connections, SFP connections, SFP+ connections, QSFP28 connections, and so forth. The first switch 110 is coupled to the network 130 through uplink ports 119. In addition, one or more of the uplink ports 119 may form the IPL 150 to couple the first switch 110 to the second switch 120. Uplink ports 119 may be any technically feasible port connection for bi-directional communications, including RJ45 connections, SFP connections, SFP+ connections, QSFP28 connections, and so forth. Processor 112 may be any technically feasible form of processing device configured to process data and execute program code. Processor 112 could be, for example, a central processing unit (CPU), a graphics processing unit (GPU), an application-specific integrated circuit (ASIC), a field-programmable gate array (FPGA), and so forth. Memory 114 may be any technically feasible storage medium configured to store data and software applications. Memory 114 may be, for example, a hard disk, a random access memory (RAM) module, a read-only memory (ROM), and so forth. As also shown, memory 114 includes auto-MLAG module 116, which is a software application that, when executed by processor 112, causes processor 112 to automatically configure the IPL 150 between the first switch 110 and the second switch 120, and to automatically configure the downlink connections between the first switch 110 and the downlink devices 160-164, as described in greater detail below.

The second switch 120 also can be any technically feasible network switch, including Ethernet switches, among others. The second switch 120 includes, without limitation, downlink ports 128, uplink ports 129, a processor 122, and a memory 124. The second switch 120 is coupled to downlink devices 160-164 through downlink ports 128. Downlink ports 128 may be any technically feasible port connection for bi-directional communications, including RJ45 connections, SFP connections, SFP+ connections, QSFP28 connections, and so forth. The second switch 120 is coupled to the network 130 through uplink ports 129. In addition, one or more of the uplink ports 129 may form the IPL 150 to couple the second switch 120 to the first switch 110. Uplink ports 129 may be any technically feasible port connection for bi-directional communications, including RJ45 connections, SFP connections, SFP+ connections, QSFP28 connections, and so forth. Processor 122 may be any technically feasible form of processing device configured to process data and execute program code. Processor 122 could be, for example, a CPU, a GPU, an ASIC, a FPGA, and so forth. Memory 124 may be any technically feasible storage medium configured to store data and software applications. Memory 124 may be, for example, a hard disk, a RAM module, a ROM, and so forth. As also shown, memory 124 includes auto-MLAG module 126, which is a software application that, when executed by processor 122, causes processor 122 to automatically configure the IPL 150 between the second switch 120 and the first switch 110, and to automatically configure the downlink connections between the second switch 120 and the downlink devices 160-164, as also described in greater detail below. Network 130 may be any technically feasible set of interconnected communication links, including a local area network (LAN), wide area network (WAN), the World Wide Web, or the Internet, among others.

The downlink devices 160-164 may be server machines or any other technically feasible networked devices.

Computing device 140 may include, without limitation, a processor 142, a memory 144, and input/output (I/O)

devices 146. Processor 142 may be any technically feasible form of processing device configured process data and execute program code. Processor 142 could be, for example, a CPU, a GPU, an ASIC, a FPGA, and so forth. Memory 144 may be any technically feasible storage medium configured to store data and software applications. Memory 144 may be, for example, a hard disk, a RAM module, a ROM, and so forth. I/O devices 146 may include devices configured to receive input, including, for example, a keyboard, a mouse, and so forth. In various embodiments, computing device 140 communicates with the first switch 110 and the second switch 120 via any technically feasible computer connection, such as a wired connection or a wireless connection, and so forth. In alternative embodiments, computing device 140 may communicate with the first switch 110 via one or more uplink ports 119 and with the second switch 120 via one or more uplink ports 129.

A user may launch the auto-MLAG modules 116 and 126 through the computing device 140. For instance, a user may enter one or more commands to the computing device 140 through a command line interface (CLI) or other interface to launch the auto-MLAG modules 116 and 126. For instance, in various embodiments, a user may enter a single command through the CLI to launch the auto-MLAG module 116 for the first switch 110, and another single command through the CLI to launch the auto-MLAG module 126 for the second switch 120. Such commands may include system information for the MLAG 105, which may include, without limitation, an auto-MLAG system_identifier, which can be used as the common MAC address for the first switch 110 and the second switch 120, which make up the MLAG 105. Upon launching of the auto-MLAG module 116 of the first switch 110, the first switch 110 may set a flag within memory 114 indicating that auto-MLAG is enabled for the first switch 110. In alternative embodiments, the computing device 140 may launch the auto-MLAG modules 116 and 126 without user intervention. In further alternative embodiments, a user may interact directly with the first switch 110 and the second switch 120 to launch auto-MLAG modules 116 and 126, respectively, without the computing device 140.

Although FIG. 1 shows the auto-MLAG module 116 stored in the memory 114 of the first switch 110 and the auto-MLAG module 126 stored in the memory 124 of the second switch 120, in alternative embodiments, a single auto-MLAG module may be stored in the memory of only one of the switches. In other alternative embodiments, one or more auto-MLAG modules may be stored in-part or entirely in the memory 144 of the computing device 140. In further alternative embodiments, all or part of one or more auto-MLAG modules may be stored remotely and accessed through the network 130.

As described in greater detail below in conjunction with FIGS. 2-4, the auto-MLAG module 116 automatically determines and/or receives additional system information for the MLAG 105, which may include, without limitation, a model number for the first switch 110, automatically retrieves all information relating to the downlink ports 118 and the uplink ports 119 of the first switch 110, automatically configures the IPL 150 between the first switch 110 and the second switch 120, and automatically configures the connections between the first switch 110 and the downlink devices 160-164. Similarly, the auto-MLAG module 126 automatically determines and/or receives additional system information for the MLAG 105, which may include, without limitation, a model number for the second switch 120, automatically retrieves all information relating to the downlink ports 128 and the uplink ports 129 of the second switch 120, automatically configures the IPL 150 between the second switch 120 and the first switch 110, and automatically configures the connections between the second switch 120 and the downlink devices 160-164.

Automatic Configuration of the MLAG

Figure 2:
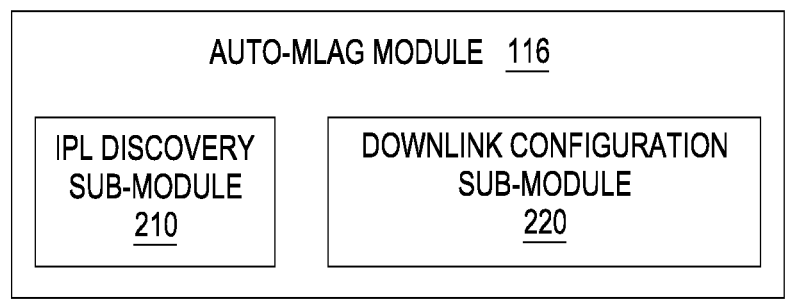
FIG. 2 is a more detailed illustration of one of the auto-MLAG modules of FIG. 1, according to various embodiments of the present invention.

FIG. 2 is a more detailed illustration of one of the auto-MLAG modules of FIG. 1, according to various embodiments of the present invention. As shown, auto-MLAG module 116 for the first switch 110 includes, without limitation, an IPL discovery sub-module 210 and a downlink configuration sub-module 220. Although the auto-MLAG module 116 for the first switch 110 is shown and described, persons skilled in the art will understand that the auto-MLAG module 126 for the second switch 120 operates in substantially the same manner as the auto-MLAG module 116.

The auto-MLAG module 116 first receives system information for the MLAG 105, which may include, without limitation, an auto-MLAG system_identifier, for instance, from a user command entry to the computing device 140 through a command line interface (CLI), where this auto-MLAG system_identifier forms the common MAC address shared by both the first switch 110 and the second switch 120. The IPL discovery sub-module 210 then automatically configures the IPL 150 between the first switch 110 and the second switch 120. In so doing, the IPL discovery sub-module 210 determines and/or receives additional system information for the MLAG 105, which may include, without limitation, the model number for the first switch 110. In various embodiments, the model number for the first switch 110 may be encoded within and retrieved from within the IPL discovery sub-module 210 or from within the auto-MLAG module 116. In alternative embodiments, the model number for the first switch 110 may be retrieved from the memory 114 within the first switch 110, retrieved from the memory 144 within the computing device 140, or downloaded from the network 130.

Subsequently, the IPL discovery sub-module 210 retrieves information relating to the uplink ports 119 of the first switch 110 based on the received system information, such as the model number for the first switch 110. The information relating to the uplink ports 119 may include, without limitation, the total number of uplink ports, special configuration parameters, and/or any other information regarding the uplink ports 119. In various embodiments, the information relating to the uplink ports 119 may be encoded within and retrieved from within the IPL discovery sub-module 210 or from within the auto-MLAG module 116, based on the model number for the first switch 110. In alternative embodiments, the information relating to the uplink ports 119 may be retrieved from the memory 114 within the first switch 110, retrieved from the memory 144 within the computing device 140, or downloaded from the network 130.

For each uplink port "P" included in the uplink ports 119, the IPL discovery sub-module 210 transmits discovery packets periodically on the uplink port "P." In various embodiments, the discovery packets transmitted by the first switch 110 may include system information for the MLAG 105, including, without limitation, the received auto-MLAG system_identifier and/or the model number for the first switch 110. In alternative embodiments, the discovery packets transmitted by the first switch 110 may also include a flag indicating whether auto-MLAG is enabled in the first switch 110. The IPL discovery sub-module 210 may be configured to transmit one discovery packet at every periodic interval, for instance, a time TX_limit. Therefore, with the first switch 110 and the second switch 120 connected via the IPL 150, if the uplink port "P" is part of the IPL 150, then the second switch 120 receives the discovery packets periodically transmitted by the first switch 110. Similarly, if the first switch 110 and the second switch 120 execute corresponding IPL discovery sub-modules 210 at the same time, the first switch 110 receives any discovery packets periodically transmitted by the second switch 120 on an uplink port that is part of the IPL 150, such as on the uplink port "P." Correspondingly, in various embodiments, these discovery packets received from the second switch 120 may include corresponding system information for the MLAG 105, such as the auto-MLAG system_identifier and/or a model number for the second switch 120.

The IPL discovery sub-module 210 is further configured to determine, for each uplink port "P," whether the first switch 110 receives discovery packets from the second switch 120. If the first switch 110 does not receive any discovery packet within a predetermined period on the uplink port "P," then the IPL discovery sub-module 210 concludes that the uplink port "P" is not part of the IPL 150. For instance, the predetermined period for receiving a discovery packet may be a period RX_limit, where RX_limit is greater than TX_limit. In various embodiments, RX_limit may be substantially greater than TX_limit, such as multiple times the value of TX_limit, to allow the IPL 150 to be maintained despite one or more discovery packets encountering a delay or a failure occurring during transmission or reception.

When the first switch 110 receives a discovery packet on the uplink port "P," the IPL discovery sub-module 210 determines whether the system information for the MLAG 105 received by the first switch 110, such as the auto-MLAG system_identifier received by the auto-MLAG module 116 and/or the model number for the first switch 110, matches the corresponding system information for the MLAG 105 included in the received discovery packet, such as the auto-MLAG system_identifier and/or the model number for the second switch 120. For instance, if the system information for the MLAG 105 received at the first switch 110 matches the corresponding system information for the MLAG 105 included in the received discovery packet, such as if the auto-MLAG system_identifier received by the auto-MLAG module 116 matches the auto-MLAG system_identifier included in the received discovery packet, and the model number for the first switch 110 matches the model number for the second switch 120 included in the received discovery packet, then the IPL discovery sub-module 210 concludes that the uplink port "P" forms part of the IPL 150. In this case, if the uplink port "P" has not already been designated as part of the IPL 150, then the IPL discovery sub-module 210 adds the uplink port "P" to a list of uplink ports that form the IPL 150, and the IPL discovery sub-module 210 configures the uplink port "P" as part of the inter peer link 150 connecting the first switch 110 and the second switch 120. Conversely, if the system information for the MLAG 105 received by the first switch 110 does not match the corresponding system information for the MLAG 105 included in the received discovery packet, such as if either the auto-MLAG system_identifiers or the switch model numbers do not match, then the IPL discovery sub-module 210 concludes that the uplink port "P" does not form part of the IPL 150. In this case, if the uplink port "P" has already been designated as part of the IPL 150, then the IPL discovery sub-module 210 removes the uplink port "P" from the list of uplink ports that form the IPL 150.

The downlink configuration sub-module 220 automatically configures the connections between the first switch 110 and the downlink devices 160-164. In so doing, the downlink configuration sub-module 220 determines and/or receives system information for the MLAG 105, which may include, without limitation, the model number for the first switch 110. In various embodiments, the model number for the first switch 110 may be encoded within and retrieved from within the downlink configuration sub-module 220 or from within the auto-MLAG module 116. In alternative embodiments, the model number for the first switch 110 may be retrieved from the memory 114 within the first switch 110, retrieved from the memory 144 within the computing device 140, or downloaded from the network 130.

The downlink configuration sub-module 220 then retrieves information relating to the downlink ports 118 of the first switch 110 based on the received system information, such as the model number for the first switch 110. The information relating to the downlink ports 118 may include, without limitation, the total number of downlink ports, special configuration parameters, and/or any other information regarding the downlink ports 118. In various embodiments, the information relating to the downlink ports 118 may be encoded within and retrieved from within the downlink configuration sub-module 220 or from within the auto-MLAG module 116, based on the model number for the first switch 110. In alternative embodiments, the information relating to the downlink ports 118 may be retrieved from the memory 114 within the first switch 110, retrieved from the memory 144 within the computing device 140, or downloaded from the network 130.

The downlink configuration sub-module 220 then configures the downlink connection to each of the downlink devices 160-164 via a looping algorithm. More specifically, the downlink configuration sub-module 220 initializes one or more loop parameters, such as a loop_counter, to loop through each downlink port included in the downlink ports 118. With each iteration of a loop, the downlink configuration sub-module 220 increments the loop_counter and configures a connection from a different downlink port included in the set of downlink ports 118 to a different one of the downlink devices 160-164. The downlink configuration sub-module 220 continues executing in this fashion until the loop_counter reaches the total number of downlink ports, indicating that connections from all downlink ports included in the set of downlink ports 118 to all of the downlink devices 160-164 have been configured.

Figure 3:
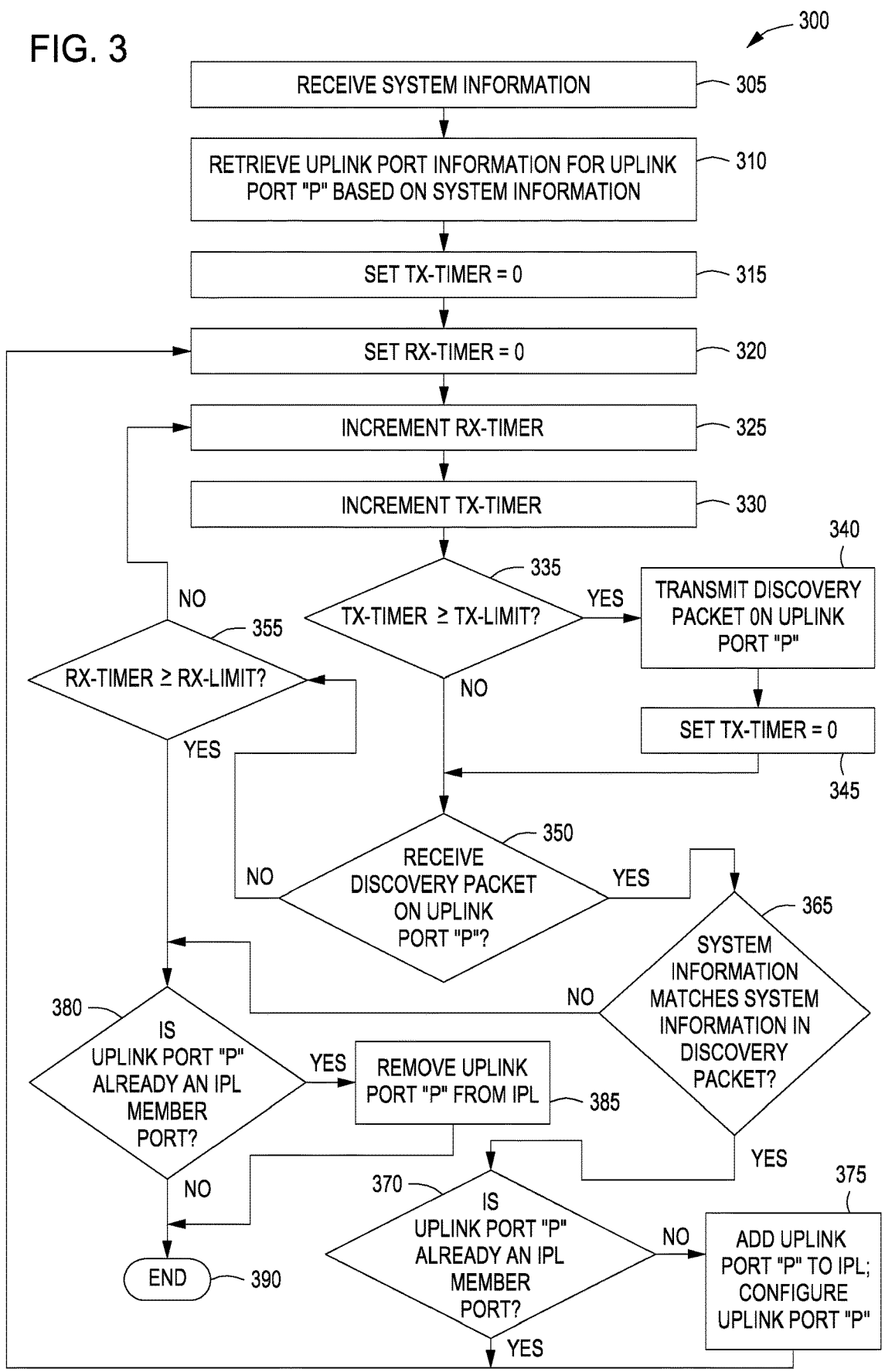
FIG. 3 is a flow diagram of method steps for performing inter peer link (IPL) discovery on one or more uplink ports of a switch, according to various embodiments of the present invention.

FIG. 3 is a flow diagram of method steps for performing inter peer link (IPL) discovery on one or more uplink ports of a switch, according to various embodiments of the present invention. Although the method steps are described in conjunction with FIGS. 1 and 2, persons skilled in the art will understand that any system configured to perform the method steps, in any order, falls within the scope of the present invention. In addition, although the method steps are described as performed by the IPL discovery sub-module 210 of the auto-MLAG module 116 for the first switch 110, persons skilled in the art will understand that the auto-MLAG module 126 of the second switch 120 may be configured to operate in substantially the same manner as set forth below.

As shown, a method 300 begins at step 305, where the IPL discovery sub-module 210 of the auto-MLAG module 116 of the first switch 110 receives system information for the MLAG 105, which may include, without limitation, an auto-MLAG system_identifier, where this auto-MLAG system_identifier forms the common MAC address shared by both the first switch 110 and the second switch 120. For instance, this auto-MLAG system_identifier may be received from a user command entry to the computing device 140 through a command line interface (CLI). The system information for the MLAG 105 may also include, without limitation, the model number for the first switch 110. The model number for the first switch 110 may provide, among other things, the model number, any other kind of identification number, and/or associated specifications for the first switch 110. In various embodiments, the model number for the first switch 110 may be encoded within and retrieved from within the IPL discovery sub-module 210 or from within the auto-MLAG module 116. In alternative embodiments, the model number for the first switch 110 may be retrieved from the memory 114 within the first switch 110, retrieved from the memory 144 within the computing device 140, or downloaded from the network 130.

At step 310, the IPL discovery sub-module 210 retrieves information relating to the uplink ports 119 of the first switch 110 based on the received system information, such as the model number for the first switch 110. The information relating to the uplink ports 119 may include, without limitation, the total number of uplink ports, special configuration parameters, and/or any other information related to the uplink ports 119. In various embodiments, the information relating to the uplink ports 119 may be encoded within and retrieved from within the IPL discovery sub-module 210 or from within the auto-MLAG module 116, based on the model number for the first switch 110. In alternative embodiments, the information relating to the uplink ports 119 may be retrieved from the memory 114 within the first switch 110, retrieved from the memory 144 within the computing device 140, or downloaded from the network 130.

As also shown, for each uplink port "P" included in the uplink ports 119, the IPL discovery sub-module 210 is configured to perform the following steps. At step 315, the IPL discovery sub-module 210 sets a timer TX_timer equal to 0. At step 320, the IPL discovery sub-module 210 sets a timer RX_timer equal to 0. At step 325, the IPL discovery sub-module 210 increments the timer RX_timer. At step 330, the IPL discovery sub-module 210 increments the timer TX_timer.

Subsequently, at step 335, the IPL discovery sub-module 210 determines whether the timer TX_timer is greater than or equal to a threshold time TX_limit. If the timer TX_timer is greater than or equal to the threshold TX_limit, then the method 300 proceeds to step 340, where the IPL discovery sub-module 210 transmits a discovery packet on the uplink port "P." As explained above, the discovery packets transmitted by the first switch 110 may include system information for the MLAG 105, including, without limitation, the received auto-MLAG system_identifier and/or the model number for the first switch 110. As will be appreciated, these preceding steps allow the IPL discovery sub-module 210 to transmit discovery packets periodically on the uplink port "P" at every periodic interval, for instance, at the threshold time TX_limit. Accordingly, with the first switch 110 and the second switch 120 connected via the IPL 150, if the uplink port "P" is part of the IPL, then the second switch 120 receives the discovery packets periodically transmitted by the first switch 110. At step 345, the IPL discovery sub-module 210 resets the timer TX_timer equal to zero. The method 300 then proceeds to step 350.

Returning now to step 335, if the IPL discovery sub-module 210 determines that the timer TX_timer is not yet greater than or equal to the threshold TX_limit, then the method 300 proceeds directly to step 350.

At step 350, the IPL discovery sub-module 210 determines whether a discovery packet has been received on the uplink port "P" from the second switch 120. For example, if the first switch 110 and the second switch 120 execute corresponding IPL discovery sub-modules 210 at the same time, then the first switch 110 receives any discovery packets periodically transmitted by the second switch 120 on an uplink port that is part of the IPL 150, such as on the uplink port "P."

If at step 350, the IPL discovery sub-module 210 does not receive a discovery packet on the uplink port "P," then the method 300 proceeds to step 355. At step 355, the IPL discovery sub-module 210 determines whether the timer RX_timer is greater than a threshold time RX_limit. As explained above, the threshold RX_limit may be greater than the threshold TX_limit, and in various embodiments, RX_limit may be substantially greater than TX_limit, such as multiple times the value of TX_limit, to allow the IPL to be maintained despite one or more discovery packets encountering a delay or a failure occurring during transmission or reception.

If the IPL discovery sub-module 210 determines that the timer RX_timer is greater than the threshold RX_limit, then the IPL discovery sub-module 210 concludes that the uplink port "P" is not part of the IPL 150, and the method 300 proceeds to step 380. At step 380, the IPL discovery sub-module 210 determines whether the uplink port "P" has already been designated as part of the IPL 150. If not, then, at step 390, the IPL discovery process for the uplink port "P" terminates.

Returning now to step 380, if the IPL discovery sub-module 210 determines that the uplink port "P" has already been designated as part of the IPL 150, then, at step 385, the IPL discovery sub-module 210 removes the uplink port "P" from the list of uplink ports that form the IPL 150, and the method 300 proceeds to step 390, as described above.

Returning now to step 355, if the IPL discovery sub-module 210 determines that the timer RX_timer is not greater than the threshold RX_limit, then the IPL discovery sub-module 210 returns to step 325, as described above.

Returning now to step 350, if the IPL discovery sub-module 210 does receive a discovery packet on the uplink port "P," then the method proceeds to step 365. In alternative embodiments, as a part of step 350, upon receiving a discovery packet, the IPL discovery sub-module 210 may determine whether a flag in the discovery packet received from the second switch 120 indicates that auto-MLAG is enabled in the second switch 120. In further alternative embodiments, as a part of step 350, upon receiving a discovery packet, the IPL discovery sub-module 210 may determine whether a flag is set in the memory 114 to indicate that auto-MLAG is enabled in the first switch 110. If either flag indicates that auto-MLAG is not enabled in the first switch 110 or the second switch 120, then the method 300 proceeds directly to step 390, as described above. Otherwise, the method 300 proceeds to step 365, as described above. At step 365, the IPL discovery sub-module 210 determines whether the system information for the MLAG 105 received by the first switch 110, such as the auto-MLAG system_identifier received by the auto-MLAG module 116 and/or the model number for the first switch 110, matches the corresponding system information for the MLAG 105 included in the received discovery packet, such as the auto-MLAG system_identifier and/or the model number for the second switch 120. If the IPL discovery sub-module 210 determines that the system information for the MLAG 105 received at the first switch 110 does not match the corresponding system information for the MLAG 105 included in the received discovery packet, such as if either the auto-MLAG system_identifiers or the switch model numbers do not match, then the IPL discovery sub-module 210 concludes that the uplink port "P" is not part of the IPL 150, and the method 300 proceeds to step 380, as described above.

Returning now to step 365, if the IPL discovery sub-module 210 determines that the system information for the MLAG 105 received at the first switch 110 matches the corresponding system information for the MLAG 105 included in the received discovery packet, such as when the auto-MLAG system_identifier included in the received discovery packet matches the auto-MLAG system_identifier received by the auto-MLAG module 116, and the model number for the second switch 120 included in the received discovery packet matches the model number for the first switch 110, then the IPL discovery sub-module 210 concludes that the uplink port "P" forms part of the IPL 150. At step 370, the IPL discovery sub-module 210 determines whether the uplink port "P" has already been designated as part of the IPL 150. If so, then the method 300 returns to step 320, as described above. If, however, at step 370, the uplink port "P" has not already been designated as part of the IPL 150, then, at step 375, the IPL discovery sub-module 210 adds the uplink port "P" to a list of uplink ports that form the IPL 150, and the IPL discovery sub-module 210 configures the uplink port "P" to be part of the inter peer link 150 connecting the first switch 110 and the second switch 120. The method then returns to step 320, as described above.

By returning to step 320 after concluding that a given uplink port "P" forms part of the IPL 150, the IPL discovery sub-module 210 may run the IPL discovery process for the uplink port "P" on a continuous basis. Such an approach enables the IPL discovery sub-module 210 to actively monitor the state of the uplink ports that form the IPL 150 continually and remove any inactive uplink ports from the IPL 150. In alternative embodiments, the IPL discovery sub-module 210 may return to step 320 even after concluding that a given uplink port "P" does not form part of the IPL at step 390. Again, such an approach enables the IPL discovery sub-module 210 to actively monitor the state of the IPL 150 on a continuous basis and add to the IPL 150 any uplink ports that later become active and are used at that time by the IPL discovery sub-module 210 to exchange discovery packets.

Figure 4:
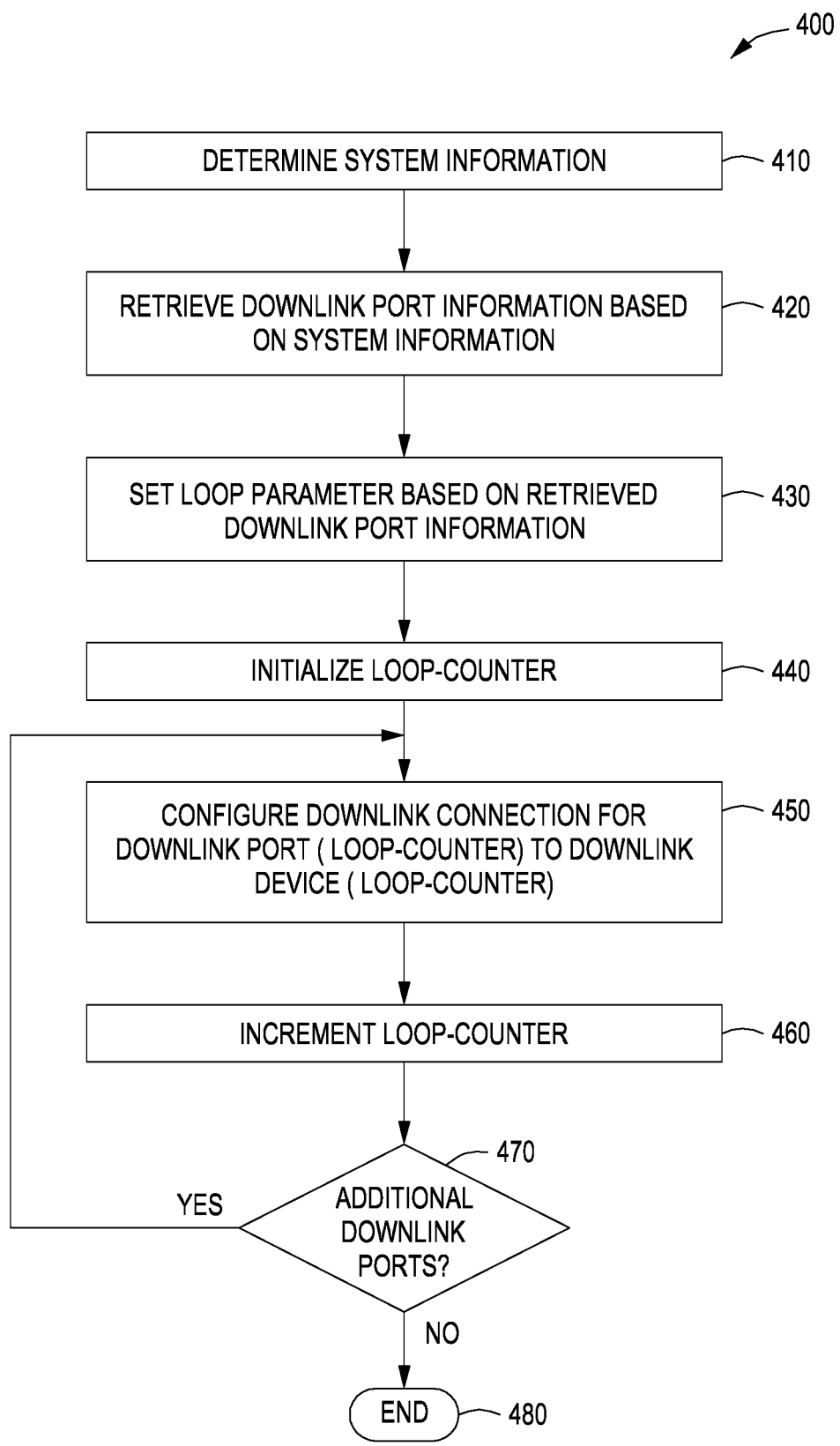
FIG. 4 is a flow diagram of method steps for configuring one or more downlink ports of a switch, according to various embodiments of the present invention.

FIG. 4 is a flow diagram of method steps for automatically configuring one or more downlink ports of a switch, according to various embodiments of the present invention. Although the method steps are described in conjunction with FIGS. 1 and 2, persons skilled in the art will understand that any system configured to perform the method steps, in any order, falls within the scope of the present invention. In addition, although the method steps are described as performed by the downlink configuration sub-module 220 of the auto-MLAG module 116 for the first switch 110, persons skilled in the art will understand that the auto-MLAG module 126 of the second switch 120 may be configured to operate in substantially the same manner as set forth below.

As shown, a method 400 begins at step 410, where the downlink configuration sub-module 220 determines and/or receives system information for the MLAG 105, which may include, without limitation, the model number for the first switch 110. As described previously herein, the model number for the first switch 110 may provide, among other things, the model number, any other kind of identification number, and/or associated specifications for the first switch 110. In various embodiments, the model number for the first switch 110 may be encoded within and retrieved from within the downlink configuration sub-module 220 or from within the auto-MLAG module 116. In alternative embodiments, the model number for the first switch 110 may be retrieved from the memory 114 within the first switch 110, retrieved from the memory 144 within the computing device 140, or downloaded from the network 130.

At step 420, the downlink configuration sub-module 220 retrieves information relating to the downlink ports 118 of the first switch 110 based on the system information, such as the model number for the first switch 110. The information relating to the downlink ports 118 may include, without limitation, the total number of downlink ports, special configuration parameters, and/or any other information regarding the downlink ports 118. In various embodiments, the information relating to the downlink ports 118 may be encoded within and retrieved from within the downlink configuration sub-module 220 or from within the auto-MLAG module 116, based on the model number for the first switch 110. In alternative embodiments, the information relating to the downlink ports 118 may be retrieved from the memory 114 within the first switch 110, retrieved from the memory 144 within the computing device 140, or downloaded from the network 130.

At step 430, the downlink configuration sub-module 220 sets one or more loop parameters. For example, the downlink configuration sub-module 220 may set a number of downlink ports parameter equal to the number of downlink ports 118 present on the first switch 110. At step 440, the downlink configuration sub-module 220 initializes a loop_counter parameter, such as by setting the loop_counter to be equal to 0.

At step 450, the downlink configuration sub-module 220 configures a downlink connection between one of the downlink ports included in the set of downlink ports 118, corresponding to the value of loop_counter, and one of the downlink devices 160-164, also corresponding to the value of loop-counter. For instance, for the initialized value of loop_counter, the downlink configuration sub-module 220 performs one or more operations to configure a connection between a first downlink port included in the downlink ports 118 and a first downlink device 160. Subsequently, at step 460, the downlink configuration sub-module 220 increments the value of loop_counter.

The method 400 then proceeds to step 470, where the downlink configuration sub-module 220 determines whether there are additional downlink connections to be configured, such as by determining whether the incremented value of loop_counter is equal to the number_of_downlink_ports parameter. For instance, if the downlink configuration sub-module 220 determines that there are no additional downlink connections to be configured, such as when the incremented value of loop_counter is equal to the number_of_downlink_ports parameter, then the method 400 proceeds to step 480, where the automatic configuration process for the downlink ports terminates.

Returning now to step 470, if the downlink configuration sub-module 220 determines that there are additional downlink connections to be configured, such as when the incremented value of loop_counter is not equal to the number_of_downlink_ports parameter, then the method returns to step 450, as described above, to allow another downlink connection to be configured.

The downlink configuration sub-module 220 continues executing steps 450 to 470, in looping fashion, to configure all downlink ports. In each iteration of the loop, one downlink connection is configured, and the loop_counter is incremented. The loop is repeated until all downlink connections via all downlink ports have been configured, such as when the loop_counter reaches the total number of downlink ports. Once the loop_counter equals the number_of_downlink_ports parameter, indicating that all downlink ports included in the set of downlink ports 118 have been configured, the method 400 terminates.

In alternative embodiments, once the method 400 terminates, and the MLAG 105 is fully configured, the downlink configuration sub-module 220 may perform additional operations at certain future points in time to update the configuration of or reconfigure the MLAG 105. Those operations may include, without limitation, determining whether there has been a change in the MLAG 105, such as a change of a connection cable or a change of one of the physical switches, or determining whether the downlink configuration sub-module 220 has received any kind of restart signal to update the configuration of, or to reconfigure, the MLAG 105. The downlink configuration sub-module 220 may perform such additional operations periodically. For instance, if the downlink configuration sub-module 220 determines that either there has been a change in the MLAG 105 or the downlink configuration sub-module 220 has received a restart signal, the downlink configuration sub-module 220 may perform steps 440 to 480, as described above, to update the configuration of, or to reconfigure, the MLAG 105. Such an approach enables the downlink configuration sub-module 220 to actively monitor the state of the MLAG on a continual basis and/or actively monitor whether a restart signal has been received on a continual basis to ensure that all downlink ports 118 of the first switch 110 are properly configured at all times.

In various embodiments, MLAG functionality may be enabled on all communication ports for both the first switch 110 and the second switch 120. In alternative embodiments, a user may manually override the configuration of certain communication ports, such that MLAG functionality is enabled on some communication ports, but is not enabled for other communication ports for certain connections to certain downlink devices 160-164.

In various other embodiments, the downlink ports 118 and 128 of the first switch 110 and the second switch 120, respectively, may be dedicated downlink ports, and the uplink ports 119 and 129 of the first switch 110 and the second switch 120, respectively, may be dedicated uplink ports. In alternative embodiments, each port included in the downlink ports 118 and uplink ports 119 for the first switch 110, and each port included in the downlink ports 128 and uplink ports 129 of the second switch 120, may be included in a general pool of communication ports to be designated as downlink or uplink based on the needs of the communication system 100.

In various other embodiments, the first switch 110 and the second switch 120 may have the same model number. In some alternative embodiments, the first switch 110 and the second switch 120 may have different model numbers, but may include the same number of communication ports. For example, the switches can be standardized or clone switch devices having substantially similar specifications, but different manufacturers and/or model numbers. In other alternative embodiments, the first switch 110 and the second switch 120 may have different model numbers and a different number of communication ports. In such a case, a downlink port 118 of the first switch 110 may be paired with a corresponding downlink port 128 of the second switch 120, such that MLAG communication is enabled on each such pair of downlink ports, even though the total number of communication ports may be different for the two switches.

In sum, an approach for more effectively configuring the IPL and links of an MLAG system is disclosed. Specifically, hundreds of commands that are entered manually through a CLI, according to conventional approaches, are replaced with as few as two commands, one for each switch of the MLAG system. The two commands trigger an automatic configuration process to configure the IPL interface for the MLAG system and all links to downlink transmitting devices coupled to each switch. More specifically, each of the two commands may include system information, such as a system_identifier, to set the system_identifier to be the MAC address implemented for the MLAG system. Further, each of the two commands launches an IPL discovery process for the switch, where discovery packets are periodically transmitted via each uplink port of the switch. Each such discovery packet received on an uplink port is analyzed to determine whether that uplink port forms part of the IPL with the peer switch. Thus, each switch can automatically determine exactly which uplink port or ports form the IPL with the peer switch. Further, the each of the two commands launches a downlink connection configuration process for the switch, where system information such as the model number of a particular switch may indicate the number and arrangement of downlink ports for the switch. As a result, the automatic configuration process includes a looping operation to configure all connections from the different downlink ports to various downlink transmitting devices, such as server machines.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method, comprising:
   receiving a first discovery packet via a first uplink port associated with a first switch that is included in a multi-chassis link aggregation group (MLAG);
   determining that first system information associated with the MLAG matches second system information associated with the MLAG and included in the first discovery packet; and
   in response to the determining, concluding that the first uplink port is included in an inter-peer link connecting the first switch to a second switch that is included in the MLAG.

2. The computer-implemented method of claim 1, further comprising:
   receiving a second discovery packet via a second uplink port associated with a third switch;
   determining that the first system information does not match third system information included in the second discovery packet; and
   in response to the determining, concluding that the second uplink port is not coupled via an inter-peer link to another switch that is included in the MLAG.

3. The computer-implemented method of claim 1, wherein the first system information includes a first system identifier associated with the MLAG, and the second system information includes a second system identifier associated with the MLAG.

4. The computer-implemented method of claim 3, wherein the first system identifier associated with the MLAG is received via a command line interface.

5. The computer-implemented method of claim 3, wherein the first system information further indicates a first model number associated with the first switch, and the second system information further indicates a second model number associated with the second switch.

6. The computer-implemented method of claim 5, wherein the first system information matches the second system information if the first system identifier matches the second system identifier and if the first model number matches the second model number.

7. The computer-implemented method of claim 5, wherein the first system information does not match the second system information if the first system identifier does not match the second system identifier or if the first model number does not match the second model number.

8. The computer-implemented method of claim 1, wherein the first system information matches the second system information, and further comprising:
   determining that the first uplink port is not already included in the inter-peer link;
   adding the first uplink port to a list of uplink ports that are included in the inter-peer link; and
   configuring the first uplink port to be part of the inter-peer link connecting the first switch to the second switch.

9. The computer-implemented method of claim 1, wherein the first system information does not match the second system information, and further comprising:
   determining that the first uplink port is already included in the inter-peer link; and
   removing the first uplink port from a list of uplink ports that are included in the inter-peer link.

10. The computer-implemented method of claim 1, further comprising transmitting discovery packets via the first uplink port at periodic intervals having a first time period.

11. The computer-implemented method of claim 10, further comprising:
    determining that a second time period has elapsed since receiving a most recent discovery packet via the first uplink port, wherein the second time period is greater than the first time period; and
    concluding that the first uplink port is not included in the inter-peer link.

12. The computer-implemented method of claim 1, wherein at least one of the first system information and the second system information includes a system identifier from which a common MAC address for the first switch and the second switch is derived.

13. The computer-implemented method of claim 1, wherein the first switch executes an auto-M LAG module that determines the first system information and the second system information.

14. The computer-implemented method of claim 13, wherein the auto-MLAG module further configures the inter-peer link connecting the first switch to the second switch.

15. The computer-implemented method of claim 13, wherein the auto-MLAG module further configures connections between a first set of downlink ports included in the first switch and one or more downlink devices.

16. The computer-implemented method of claim 15, wherein the auto-M LAG module further configures connections between a second set of downlink ports included in the second switch and the one or more downlink devices.

17. The computer-implemented method of claim 13, wherein a computing device external to the first switch and the second switch causes the first switch to execute the auto-MLAG module.

18. The computer-implemented method of claim 1, wherein a computing device external to the first switch and the second switch:
   causes the first switch to execute a first auto-MLAG module that determines the first system information; and
   causes the second switch to execute a second auto-M LAG module that determines the second system information.

19. One or more non-transitory computer-readable storage media including instructions that, when executed by one or more processors, cause the one or more processors to perform steps of:
   receiving a first discovery packet via a first uplink port associated with a first switch that is included in a multi-chassis link aggregation group (MLAG);
   determining that first system information associated with the MLAG matches second system information associated with the MLAG and included in the first discovery packet; and
   in response to the determining, concluding that the first uplink port is included in an inter-peer link connecting the first switch to a second switch that is included in the MLAG.

20. A system, comprising:
   a memory that includes instructions; and
   a processor that is coupled to the memory and, when executing the instructions:
      receives a first discovery packet via a first uplink port associated with a first switch that is included in a multi-chassis link aggregation group (MLAG);
      determines that first system information associated with the MLAG matches second system information associated with the MLAG and included in the first discovery packet;
      in response to the determining, concludes that the first uplink port is included in an inter-peer link connecting the first switch to a second switch that is included in the MLAG.

* * * * *

UNITED STATES PATENT AND TRADEMARK OFFICE
CERTIFICATE OF CORRECTION

PATENT NO. : 11,212,179 B2
APPLICATION NO. : 16/660721
DATED : December 28, 2021
INVENTOR(S) : Sahul Hameed Abdul Kader Jailani Page 1 of 1

It is certified that error appears in the above-identified patent and that said Letters Patent is hereby corrected as shown below:

In the Claims

Column 17, Claim 13, Line 5, please delete "auto-M LAG" and insert --auto-MLAG--;

Column 17, Claim 16, Line 17, please delete "auto-M LAG" and insert --auto-MLAG--;

Column 17, Claim 18, Lines 30-31, please delete "auto-M LAG" and insert --auto- MLAG--.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*